United States Patent

Sextro

[11] Patent Number: 5,867,152
[45] Date of Patent: Feb. 2, 1999

[54] ON-LINE LASER ALIGNMENT SYSTEM FOR THREE DIMENSIONAL DISPLAY

[75] Inventor: Gary L. Sextro, McKinney, Tex.

[73] Assignee: Raytheon TI Systems, Inc., Lewisville, Tex.

[21] Appl. No.: 615,070

[22] Filed: Mar. 14, 1996

Related U.S. Application Data

[63] Continuation of Ser. No. 215,831, Mar. 22, 1994, abandoned.

[51] Int. Cl.[6] .............................. G09G 1/00; H04N 17/02
[52] U.S. Cl. ................................ 345/207; 345/6; 345/10; 348/190
[58] Field of Search ................................ 348/51, 52, 262, 348/269, 189–191; 359/462, 471, 472, 475; 345/207, 6, 1–3, 12, 10–11

[56] References Cited

U.S. PATENT DOCUMENTS

| | | | |
|---|---|---|---|
| 4,379,292 | 4/1983 | Mirato et al. ............................ | 345/207 |
| 4,386,345 | 5/1983 | Narveson et al. ...................... | 345/207 |
| 4,730,214 | 3/1988 | Lambert et al. ........................ | 358/139 |
| 4,743,748 | 5/1988 | O'Brien ...................................... | 345/6 |
| 4,749,907 | 6/1988 | Boatwright et al. .................... | 348/189 |
| 4,859,998 | 8/1989 | Tsujihara et al. ....................... | 348/190 |
| 4,991,109 | 2/1991 | Crookshanks ........................... | 348/207 |
| 4,991,121 | 2/1991 | Minoura et al. ......................... | 345/1 |
| 4,991,127 | 2/1991 | Crookshanks ........................... | 348/262 |
| 4,999,703 | 3/1991 | Henderson ............................... | 348/190 |
| 5,042,909 | 8/1991 | Garcia, Jr. et al. ..................... | 359/478 |
| 5,233,416 | 8/1993 | Inoue ....................................... | 348/269 |

*Primary Examiner*—Lun-Yi Lao
*Attorney, Agent, or Firm*—Baker & Botts, L.L.P.

[57] ABSTRACT

A 3D display having a closed loop feedback system dynamically adjusting the scanning pattern of laser beams on-line to maintain pointing errors of all scanned images to a specified tolerance. A predetermined alignment pattern, preferably a matrix of dots with known coordinates, is periodically injected into the image data path, preferably during non-display periods. A grid is disposed on each of two mirrors which enter into two separate light paths and are scanned. The mirrors reflect the laser beams from the grid to an optical sensor for each beam, each sensor connected to an A/D converter and producing an output proportional to the intensity of the reflected light. The sensor output is an analog function of the light intensity impinging thereon. The digitized values are stored in a grid buffer which accumulates an entire intensity pattern of grid points. The the intensity data is collected for offset and gain beams separately and the x and y centroid is computed for the gain and offset grid and used to compute adjustment values for the offset, gain and power intensity of the normal data values sent to the optics. A reference intensity sets the nominal value to which the loop corrects. The adjustment values are applied to the display data before being sent to the optics and are applied to the predetermined alignment pattern, allowing the loop to close to a specified accuracy, depending upon loop bandwidth and time constant. A linearity lookup value is applied to the display data to compensate for any fixed nonlinearity in the data path due to optics or fabrication errors.

11 Claims, 1 Drawing Sheet

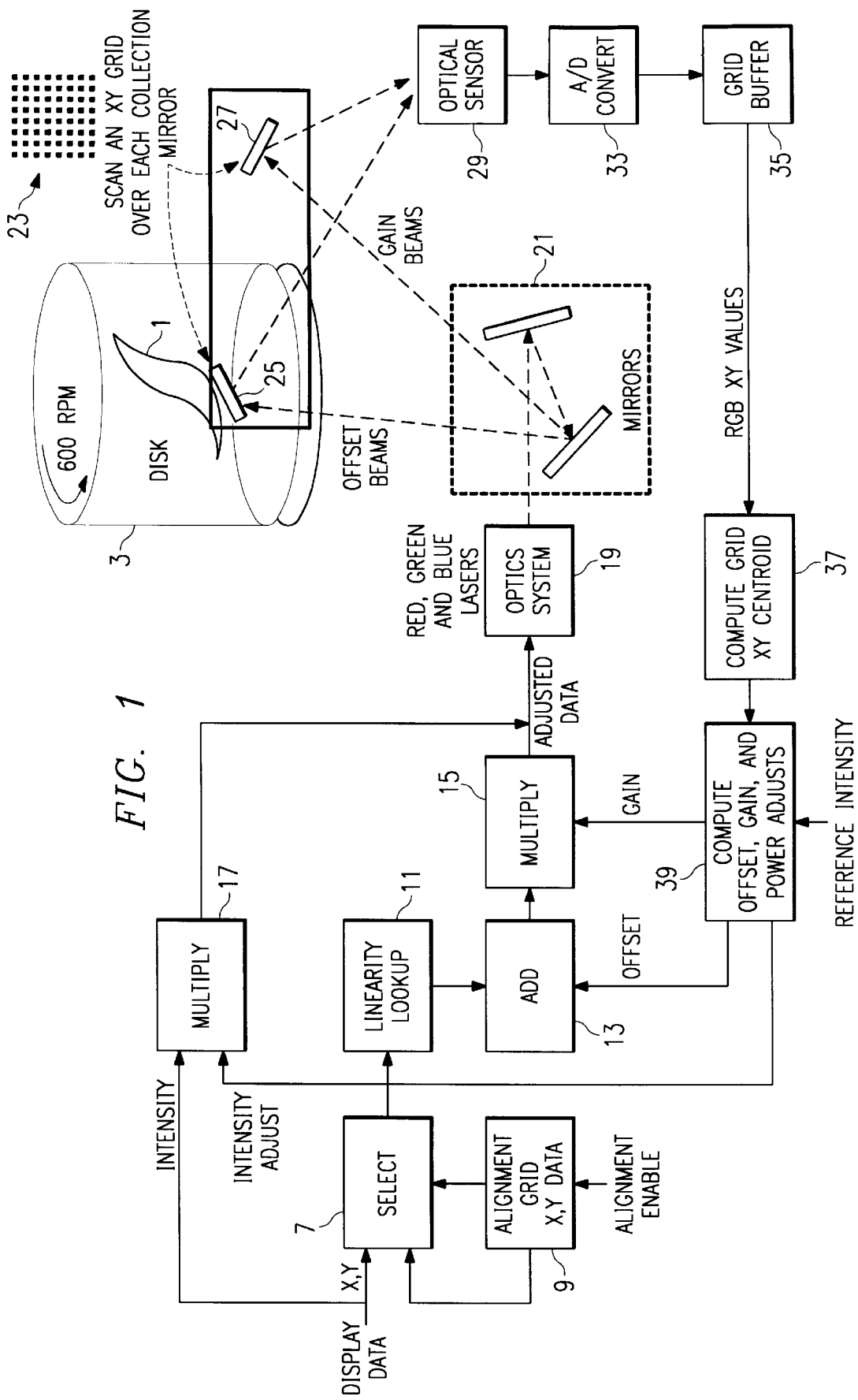

ON-LINE LASER ALIGNMENT SYSTEM FOR THREE DIMENSIONAL DISPLAY

This is a continuation of application Ser. No. 08/215,831 filed Mar. 22, 1994, now abandoned.

BACKGROUND OF THE INVENTION

1. Field of the Invention

This invention relates to a three dimensional (3D) display system and, more specifically, to a system which provides an on-line alignment capability for the lasers and the associated data path used in the projection of three dimensional images.

2. Brief Description of the Prior Art

Three dimensional display systems wherein a two dimensional scene is projected onto a rotating disk of helical shape to provide the three dimensional display are well known and are described in the patent of Garcia et al. Pat. No. 5,042,909. In current prior art 3D display systems of the above described type, the gain, offset and power intensity adjustments of the laser data path which provides the two dimensional scene are manually performed by a service technician as part of a preventive maintenance procedure while the system is shut down. Variations in the laser data path due to component aging, temperature changes, parts replacement or for any other reason which requires such realignment of the laser data path and requires that such realignment be manually conducted by a technician, cause added expense and downtime of the display system. Furthermore, when such variations take place on-line, there is no present mechanism for realigning the system on-line without shutdown.

SUMMARY OF THE INVENTION

In accordance with the present invention, there is provided an alignment system which automatically performs error measurements of the laser data path and applies correction to the data path on-line such that the overall system error is driven to a minimum at all times without system shut down and without the requirement of a technician. The invention herein has the unique advantage that the entire laser data path is compensated on-line solely by digital electronics and an alignment procedure.

Briefly, the alignment system in accordance with the present invention is a closed loop feedback system which dynamically adjusts the scanning pattern of the laser beams such that the pointing errors of all the scanned images are maintained within a specified tolerance.

The basic function and operation of the closed loop are to inject a predetermined alignment pattern, preferably in the form of an x-y grid which is a matrix of dots, the coordinates of each of the dots of which are known, into the normal image data path at periodic intervals, such as, for example, every one or two minutes, and preferably during a dead or non-display period using one or two pixels every revolution. The preferred alignment pattern comprises a grid of x-y points on each of a pair of collection mirrors which are thrust into two separate light paths from the scanning mirrors, the center and outer edge of which are scanned. These collection mirrors reflect the scanning laser beams from the grid to an optical sensor, one beam for offset and one beam for gain, which produces an electrical output proportional to the intensity of the light reflected thereto by the collection mirrors. The electrical output of the optical sensor is an analog function of the intensity of the light impinging on the sensor, this output being digitized by an analog to digital (A/D) converter. The digitized value for each dot is stored in a grid buffer which accumulates an entire intensity pattern of x-y points of the grid. Once the intensity data is collected for offset and gain beams separately, the x and y centroid is computed for the gain and offset grid. The centroids are then used to compute adjustments values for the offset, gain and power intensity of the normal data values sent to the optics. A reference intensity is used to set the nominal value to which the loop corrects. The adjustment values are then applied to the display data before being sent to the optics. These adjustments are also applied to the predetermined alignment pattern, allowing the loop to close to a specified accuracy, depending upon the bandwidth and time constant of the loop. A linearity lookup value is also applied to the display data. This value compensates for any fixed nonlinearity in the data path due to optical scanners or fabrication errors.

BRIEF DESCRIPTION OF THE DRAWING

The FIGURE is a block diagram of the on-line laser alignment system in accordance with the present invention.

DESCRIPTION OF THE PREFERRED EMBODIMENT

Referring now to the FIGURE, there is shown a 3D display 1 formed by a spinning disk 3 of the type set forth in patent of Garcia et al. Pat. No. 5,042,909, the specifications of which are incorporated herein by reference. The disk 3 is spinning at 600 RPM, though this rate is not critical as long as it is sufficiently high to avoid flicker. The purpose of the invention herein is to insure that the display 1 is properly positioned or aligned within the cylindrical display volume.

Two dimensional or x-y display data is provided at the system input, this data passing through a select switch 7 which passes therethrough either the display data or alignment data from alignment grid x,y data 9 as will be explained hereinbelow. The display data which passes through the select switch 7 is linearized by linearity data from a linearity lookup 11 as to offset and gain and this linearization is further adjusted by a fed back offset signal which is added to the linearized data in an add circuit 13 and a fed back gain signal which is multiplied by the output of the add circuit in a multiply circuit 15 to provide an adjusted data output from the multiply circuit. The linearity data provides correction to the input data which will compensate for errors in the position of the scanned laser dots. The add circuit 13 performs the twos complements addition of two binary numbers, resulting in a twos complement binary output number. The multiply function in the multiply circuit 15 performs the twos complement multiplication of two binary numbers and results in a twos complement binary number.

The display data at the input also includes intensity information which is adjusted by a multiply circuit 17, the adjusted intensity signal being fed to the optics system 19 along with the adjusted input data signals. Intensity data determines the brightness of each laser dot and is adjusted by the multiply circuit 17. This adjusted data operates the optics system 19 which is composed of red, green and blue lasers by adjusting the intensity of the output from each of these lasers as well as adjusting the angle at which the output from the lasers impinges upon the scanning mirrors 21 to compensate for any detected offset in the system. The output of the lasers 19 is scanned across and reflected from the scanning mirrors 21 onto the rotating disk 1 to provide the 3D image in the manner discussed in the above noted Garcia et al. patent.

In order to adjust for offset, gain and power, a two dimensional grid 23 composed of a plurality of dots, preferably in a matrix arrangement, is interposed into the path of the offset and gain laser beams during dead time (i.e., when the optics system is returning to its initial scanning position). During this dead time period, the beams from the lasers impinge upon one or more of the dots in the grid 23, the location of the dots being accurately predetermined and stored in the system alignment grid 9. A grid 23 is disposed on each of a pair of collection mirrors 25 and 27 with the offset beam being reflected from collection mirror 25 and the gain beam being reflected from the collection mirror 27. Both the reflected offset beam and the reflected gain beam are sensed by an optical sensor 29, one sensor for each beam, which senses the intensity of each of the reflected beams, this intensity being converted to a digital value by an analog to digital (A/D) converter 33. The digital signals are stored in a grid buffer 35 and these stored signal are fed to a system which computes the grid x-y centroid 37 therefrom. The centroid of each x,y grid of points is computed as follows:

$$X \text{ centroid} = \frac{\Sigma X \text{ position } (i) * \text{value of } X \text{ position } (i)}{\Sigma \text{ value of } X \text{ position } (i)}$$

$$Y \text{ centroid} = \frac{\Sigma Y \text{ position } (i) * \text{value of } Y \text{ position } (i)}{\Sigma \text{ value of } Y \text{ position } (i)}$$

The centroid is then used to determine the changes required in the offset and the gain. This is computed in the compute offset, gain and power adjusts 39 in accordance with the following procedure: Given the computed centroid of the grid, a delta is computed for x and y as the difference from the centroid and the expected value. This delta is computed for the gain and offset grids. Likewise, the power from the centroid is subtracted from the reference intensity and the result is used to adjust the intensity of the incoming data. The offset error adjustment is fed to the add circuit 13 for addition to the next scanning frame whereas the gain error adjustment is fed to the multiplier circuit 15 for multiplication of the output of the adder. In addition, a reference intensity signal is compared with the intensity of the signal on the grid, the grid signal amplitude is compared to reference and the difference is the error in intensity or intensity adjustment signal. The intensity adjustment signal from the compute circuit 39 is applied to the multiply circuit 17 for multiplication of the intensity signal which forms a part of the display data at the input to the system. In this way, all computed errors in offset, gain and intensity are fed back for adjustment of these parameters during the next scan. This is repeated from scan to scan to, on-line, continually remove system errors.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

I claim:

1. An on-line beam adjustment system for a light beam in a three dimensional display, comprising:

an alignment pattern comprising a plurality of symbols, each symbol having a known coordinate and a predetermined light intensity value;

a first reflecting device operable to reflect an offset beam at predetermined intervals to generate a display of a selected set of the symbols at each interval;

a second reflecting device operable to reflect a gain beam at predetermined intervals to generate a display of a selected set of the symbols at each interval;

a sensing device operable to generate a plurality of light intensity values for the offset beam and the gain beam, each light intensity value associated with a corresponding symbol from the selected set of symbols; and a processor coupled to the sensing device and operable to adjust the light beam in response to the difference between the generated light intensity values and the predetermined light intensity values of the alignment pattern.

2. The system of claim 1, wherein the symbols comprise dots.

3. The system of claim 1, wherein the predetermined intervals comprise a period of non-formation of a three dimensional image on the display.

4. The system of claim 1, wherein the sensing device comprises:

a first optical sensor operable to generate a plurality of light intensity values for the offset beam;

a first grid buffer coupled to the first optical sensor and operable to store the light intensity values for the offset beam;

a second optical sensor operable to generate a plurality of light intensity values for the gain beam; and a second grid buffer coupled to the second optical sensor and operable to store the light intensity values for the gain beam.

5. The system of claim 4, wherein the processor further comprises:

a subsystem operable to compute an x-y centroid for the first grid associated with the offset beam; and a compute circuit coupled to the subsystem and operable to adjust the offset of the light beam in response to the difference between the computed x-y centroid associated with the offset beam and an expected value associated with the alignment pattern.

6. The system of claim 4, wherein the processor further comprises:

a subsystem operable to compute an x-y centroid for the second grid associated with the gain beam; and a compute circuit coupled to the subsystem and operable to adjust the gain of the light beam in response to the difference between the computed x-y centroid associated with the gain beam and an expected value associated with the alignment pattern.

7. The system of claim 1, wherein the processor further comprises a compute circuit operable to adjust the power of the light beam in response to the difference between the generated light intensity values and the predetermined light intensity values of the alignment pattern.

8. An on-line beam adjustment system for a light beam in a three dimensional display, comprising:

an alignment pattern comprising a plurality of symbols, each symbol having a known coordinate and a predetermined light intensity value;

a first reflecting surface operable to reflect an offset beam;

a second reflecting surface operable to reflect a gain beam;

a first optical sensor operable to generate a plurality of light intensity values for the offset beam;

a second optical sensor operable to generate a plurality of light intensity values for the gain beam;

a subsystem operable to compute an x-y centroid for the light intensity values associated with the offset beam and for the light intensity values associated with the gain beam; and a compute circuit coupled to the subsystem and operable to adjust the offset of the light beam in response to the difference between the computed x-y centroid associated with the offset beam and an expected value associated with the alignment pattern, and further operable to adjust the gain of the light beam in response to the difference between the computed x-y centroid associated with the gain beam and an expected value associated with the alignment pattern.

9. The system of claim 8, wherein the symbols comprise dots.

10. The system of claim 8, wherein the first reflecting surface reflects the offset beam at a predetermined interval corresponding to a period of non-formation of a three dimensional image on the display.

11. The system of claim 8, further comprising:

a first grid buffer coupled to the first optical sensor and operable to store the light intensity values for the offset beam; and a second grid buffer coupled to the second optical sensor and operable to store the light intensity values for the gain beam.

* * * * *

UNITED STATES PATENT AND TRADEMARK OFFICE
CERTIFICATE OF CORRECTION

PATENT NO. : 5,867,152
DATED : February 2, 1999
INVENTOR(S) : Sextro

It is certified that error appears in the above-identified patent and that said Letters Patent is hereby corrected as shown below:

On the title page, under item [56] Reference Cited, delete "4,859,998" and insert -- 4,857,998 --.

Signed and Sealed this

Seventeenth Day of August, 1999

Attest:

Q. TODD DICKINSON

Attesting Officer

Acting Commissioner of Patents and Trademarks